Patented May 30, 1944

2,350,282

UNITED STATES PATENT OFFICE 2,350,282

METHOD OF MAKING CATALYSTS

William A. La Lande, Jr., Upper Darby, Pa., assignor to Attapulgus Clay Company, Philadelphia, Pa., a corporation of Delaware No Drawing. Application March 14, 1942, Serial No. 434,727

7 Claims. (Cl. 252—254)

The present invention relates to the preparation of adsorbent catalysts and their use in the treatment of hydrocarbon oils, and relates more particularly to the preparation and use of activated magnesium silicates in the conversion of hydrocarbon oils into motor fuel.

An object of this invention is the production of adsorbent catalysts by reacting in aqueous solution an alkali metal silicate and a water-soluble salt of magnesium to form a water-insoluble magnesium silicate, preferably a tri silicate, and thereafter activating such silicate by treatment with a water-soluble alkaline earth metal salt.

In accordance with one aspect of my invention, an alkali metal silicate is dispersed in sufficient water to dissolve the compound, and to this solution is added a second solution containing a water-soluble salt of magnesium. While chemically equivalent amounts of alkali metal silicate and water-soluble magnesium salt may be employed, I prefer to have present in the reaction mixture, an excess of magnesium salt over that required for complete reaction with the alkali metal silicate. The mixture may be heated, preferably at its boiling point, for a period of time sufficient to complete the reaction, whereby there is produced a water-insoluble product comprising magnesium silicate corresponding to the approximate formula $MgO.3SiO_2$. This reaction may, if desired, be carried out at ordinary temperatures of the order of 70° F. to 100° F. The insoluble product is then separated from the reaction mixture by suitable means, for example, by decantation, filtering, or centrifuging, and may be washed with sufficient water to substantially remove soluble salts. However, if desired, the water washing may be dispensed with. In either case, the insoluble magnesium silicate is then activated by treatment with an aqueous solution of a water-soluble alkaline earth metal salt, for example, calcium chloride, in an amount which may be chemically equivalent to the magnesia content of the silicate. Such treatment is preferably carried out at an elevated temperature, i. e., at the boiling point of the solution. Upon completion of the activation treatment, the insoluble silicate is separated from the treating solution, washed with water to remove soluble salts, dried to a suitable volatile matter content, and reduced to particles of desired size. The activation treatment with the alkaline earth metal salt solution does not appear to involve substantial replacement of the magnesia of the magnesium silicate with alkaline earth metal, for example, calcium, since the composition of the silicate after treatment is essentially the same as before treatment. However, the catalytic efficiency of the activated silicate is markedly enhanced, as will be seen from the examples hereinafter given.

In carrying out my process, I may employ commercially available alkali metal silicates having a ratio of $Na_2O:SiO_2$ or $K_2O:SiO_2$ of 1:1 to 1:4. The silicates may be used in aqueous solution of desired concentration, and the ratio of $Na_2O:SiO_2$ or $K_2O:SiO_2$ may be adjusted by the addition of suitable quantities of NaOH or KOH. Commercial sodium silicate, such as "N" brand silicate having a ratio of $Na_2O:SiO_2$ of 1:3.22, and a Baumé gravity of 41°, has been found satisfactory for use. Alkali metal silicates produced by the treatment of silica or other highly siliceous minerals with alkali metal hydroxides, oxides, peroxides, or carbonates, may also be used. For example, materials containing alkali metal silicates produced by fusing fuller's earth, bentonite, or other naturally occurring silicates, with an alkali metal carbonate, or by treating such naturally occurring silicates with an alkali metal hydroxide solution at elevated temperatures, may be satisfactorily employed. Insofar as the water-soluble magnesium salts are concerned, I prefer to use the chloride or the sulfate, although other soluble magnesium salts may be employed. With respect to the alkaline earth metal salts which I utilize in aqueous solution to activate the magnesium silicate, a variety of such salts are available, including the chlorides, nitrates, and acetates of calcium, strontium, and barium. Since calcium chloride is relatively inexpensive and is available in large quantities, such salt is preferred. While satisfactory results may be obtained using chemically equivalent amounts of a soluble magnesium salt, based upon the alkali content of the alkali metal silicate employed, it is not necessary to do so in all cases, as the completion of the reaction may be favored by having present an excess of the magnesium salt. The alkaline earth metal salt for the activation treatment is preferably used in an amount chemically equivalent to the magnesia content of the magnesium silicate, although greater or less quantities may be employed. The concentrations of the solutions utilized may vary over a wide range, for example from 1 per cent up to saturation at the boiling point of the solution or mixture of solutions. The temperature at which the magnesium silicate-forming reaction, as well as the activation treatment, is carried out is preferably that which is necessary to maintain the solution or mixture of reactants at its boiling point, however, higher or lower temperatures may be utilized. In general, temperatures of from 150° F. to 400° F. are suitable, sufficient pressure being maintained upon the reaction mixture to prevent substantial loss of water therefrom. The reaction time and activation time will vary considerably, depending upon the quantities and concentrations of the reactants, the degree of agitation of the reaction mixture, and the temperature at which the reaction or activation is carried out. In some cases the formation of the magnesium silicate or the activation thereof may be completed in a few hours, whereas in other cases the reaction or activation may require 10 to 15 hours, or more. The magnesium silicate, upon completion of the activation, may be freed of soluble salts by washing with water, and then dried to a suitable volatile matter content (water content) prior to reduction of the silicate to desired particle size. The volatile matter content may range from 10 per cent to 30 per cent by weight, and is preferably of the order of 15 per cent to 20 per cent by weight. The particle size or mesh of the silicate may be varied as desired, depending upon the nature of the hydrocarbons to be treated, and upon the treating conditions. For example, for fixed bed catalytic cracking, the silicate may be formed into pellets of suitable size and shape, or the silicate may be used in granular form. In catalytic cracking processes of the so-called "fluid" type, the silicate may be employed as a fine powder, for example, of finer than 100 mesh.

The magnesium silicates of the present invention are not only highly efficient catalysts for the conversion of hydrocarbon oils into motor fuel, but also may be utilized as catalysts in the conversion of hydrocarbon gases into motor fuel; in the reforming of gasoline or naphtha to increase the antiknock value thereof; in the thermal treatment of oil distillates such as gasoline, kerosene, furnace oil and the like for the removal of gum-forming compounds and sulfur compounds; in the hydrogenation, dehydrogenation, or cyclization of hydrocarbon oils and gases; or as a supporter or promoter for other catalysts such as the metals, metal oxides, metal sulfides, and the like.

The cracking of hydrocarbon oils such as petroleum gas oil or higher boiling oil in the presence of the silicate catalysts of the present invention may be carried out at temperatures between 700° F. and 1150° F., and preferably between 850° F. and 1050° F., under atmospheric or superatmospheric pressure, using flow rate, for example, of from 1 to 5 volumes of oil per volume of catalyst per hour.

The reforming of gasoline stocks or heavy naphthas in the presence of the silicate catalysts to increase the antiknock value of the gasoline or naphtha may be performed at temperatures of the order of 900 F. to 1025° F. under atmospheric or higher pressure.

The conversion of hydrocarbon gases into motor fuel by cracking and polymerization in the presence of the silicate catalysts may be accomplished at temperatures between 950° F. and 1150° F., and at pressures up to about 3500 pounds per square inch, while the dehydrogenation of such gases to produce olefin hydrocarbons may be effected at similar temperatures but preferably at atmospheric or slight superatmospheric pressures.

The removal of gum-forming and sulfur compounds from hydrocarbon distillates such as gasoline, kerosene, and furnace oil may be carried out in the presence of the silicate catalysts at temperatures of the order of 550° F. to 750° F., preferably at substantially atmospheric pressure, although pressures up to about 100 pounds per square inch may be employed.

The following example will serve to illustrate the preparation and the use of the silicate adsorbents of the present invention as catalysts in the conversion of hydrocarbon oil into motor fuel.

1. 204 parts by weight of $MgCl_2.6H_2O$ was dissolved in 3000 parts by weight of water, and the resulting solution was introduced into a reaction vessel provided with a stirrer. A second solution was made up consisting of 676 parts by weight of "N" brand sodium silicate ($1Na_2O:3.22SiO_2$, 41° Bé.) and 1000 parts by weight of water, and this solution was added to the solution first mentioned over a period of 30 minutes with vigorous stirring. As a result of the reaction between the sodium silicate and the magnesium chloride, there was produced a white, insoluble precipitate comprising magnesium silicate, which was filtered from the solution.

The insoluble magnesium silicate was then dispersed in 2000 parts by weight of water, and the mixture was introduced into a reaction vessel provided with a stirrer and a reflux condenser. A solution consisting of 111 parts by weight of $CaCl_2$ in 1000 parts by weight of water was added to the magnesium silicate-water mixture in the reaction vessel. The entire mixture was then boiled for 2 hours at 212° F., with vigorous agitation, the reflux condenser serving to prevent loss of water. Upon completion of this activation treatment, the insoluble magnesium silicate was filtered from the treating solution, washed free of soluble salts with water, and air dried. The activated product so produced had a volatile content (water) of 26.1 per cent by weight, determined by heating a sample of it at 1800° F. for 20 minutes. The volume weight of the product (26.1 per cent volatile content) was 38.5 pounds per cubic foot.

In order to determine the efficiency of the activated magnesium silicate as a catalyst in the conversion of petroleum hydrocarbons into motor fuel, the silicate was compressed into small pellets in a conventional pelleting machine, and the pellets were introduced into an externally heated reaction vessel. A petroleum gas oil, having a distillation range of 282° F. to 692° F. and an A. P. I. gravity of 33.1° was vaporized and passed at substantially atmospheric pressure through the reaction vessel containing the activated magnesium silicate pellets. The reaction temperature was maintained at 888° F., and the flow rate at 1 volume of gas oil per volume of catalyst per hour. The products of the cracking reaction were collected and separated by fractionation, and there was obtained 30.9 per cent by volume of 400° F. end point gasoline, and 5.9 per cent by weight of uncondensed gas.

By way of comparison, a magnesium silicate was prepared by adding to a solution consisting of 204 parts by weight of $MgCl_2.6H_2O$ in 3000 parts by weight of water, a second solution consisting of 676 parts by weight of "N" brand sodium silicate in 1000 parts by weight of water. The reaction mixture was boiled for 2 hours under a reflux condenser, and the resulting insoluble magnesium silicate was filtered from the solution, washed with water, and air dried. This silicate was formed into pellets, and tested for cracking efficiency under substantially the same conditions as described hereinabove with reference to the CaCl₂-activated magnesium silicate. The unactivated magnesium silicate gave a yield of 25 per cent by volume of 400° F. end point gasoline, and 4.5 per cent by weight of uncondensed gas.

The catalyst compositions of the present invention may be regenerated or revivified after their catalytic activity has decreased through adsorption of carbonaceous materials during use, by treating such used catalysts with a solvent or solvent mixture capable of dissolving or displacing the undesirable carbonaceous materials. For example, the used catalysts may be washed with naphtha, alcohols, ketones, benzol, chlorinated hydrocarbon solvents, or mixtures thereof such as naphtha and acetone, in order to dissolve and remove adsorbed carbonaceous materials. Or, the used catalysts, with or without preliminary washing or steaming, may be regenerated by heating, preferably in the presence of air, or gases containing controlled amounts of oxygen, in order to remove carbonaceous impurities.

I claim:

1. The method of producing a catalyst composition which comprises reacting, in aqueous solution, an alkali metal silicate with an excess of a water-soluble salt of magnesium to form a water-insoluble magnesium silicate having present therein insufficient fixed alkali to deleteriously affect the catalytic activity of the same, and treating said magnesium silicate with an aqueous solution of an alkaline earth metal salt.

2. The method of producing a catalyst composition which comprises reacting, in aqueous solution, an alkali metal silicate with an excess of a water-soluble salt of magnesium to form a water-insoluble magnesium silicate having present therein insufficient fixed alkali to deleteriously affect the catalytic activity of the same, treating said magnesium silicate with an aqueous solution of an alkaline earth metal salt at elevated temperatures, and separating said treated magnesium silicate from said solution.

3. The method of producing a catalyst composition which comprises reacting, in aqueous solution, an alkali metal silicate with an excess of a water-soluble salt of magnesium to form a water-insoluble magnesium silicate having present therein insufficient fixed alkali to deleteriously affect the catalytic activity of the same, treating said magnesium silicate with an aqueous solution of an alkaline earth metal salt at elevated temperatures, separating said treated magnesium silicate from said solution, washing said silicate to remove soluble salts, and drying the washed silicate.

4. The method of producing a catalyst composition which comprises reacting, in aqueous solution, an alkali metal silicate with an excess of a water-soluble salt of magnesium to form a water-insoluble magnesium silicate having present therein insufficient fixed alkali to deleteriously affect the catalytic activity of the same, and treating said magnesium silicate with an aqueous solution of calcium chloride.

5. The method of producing a catalyst composition which comprises reacting, in aqueous solution, sodium silicate with an excess of magnesium chloride to form a water-insoluble magnesium silicate, and treating said magnesium silicate having present therein insufficient fixed alkali to deleteriously affect the catalytic activity of the same with an aqueous solution of calcium chloride.

6. The method of producing a catalyst composition which comprises reacting, in aqueous solution, sodium silicate with an excess of magnesium chloride to form a water-insoluble magnesium silicate having present therein insufficient fixed alkali to deleteriously affect the catalytic activity of the same, treating said magnesium silicate with an aqueous solution of an alkaline earth metal salt at elevated temperatures, and separating said treated magnesium silicate from said solution.

7. The method of producing a catalyst composition which comprises reacting, in aqueous solution, sodium silicate with an excess of magnesium chloride to form a water-insoluble magnesium silicate having present therein insufficient fixed alkali to deleteriously affect the catalytic activity of the same, treating said magnesium silicate with an aqueous solution of an alkaline earth metal salt at elevated temperatures, separating said treated magnesium silicate from said solution, washing said silicate to remove soluble salts, and drying the washed silicate.

WILLIAM A. LA LANDE, JR.

CERTIFICATE OF CORRECTION.

Patent No. 2,350,282.

May 30, 1944.

WILLIAM A. LA LANDE, JR.

It is hereby certified that error appears in the printed specification of the above numbered patent requiring correction as follows: Page 3, second column, lines 22 to 24 inclusive, claim 5, strike out the words "having present therein insufficient fixed alkali to deleteriously affect the catalytic activity of the same" and insert the same after the word "silicate" in line 21, same claim; and that the said Letters Patent should be read with this correction therein that the same may conform to the record of the case in the Patent Office.

Signed and sealed this 1st day of August, A. D. 1944.

(Seal)

Leslie Frazer
Acting Commissioner of Patents.